July 3, 1956  G. W. EMELE  2,752,896
CRANKCASES, PARTICULARLY FOR V-TYPE DIESEL ENGINES
Filed April 21, 1952
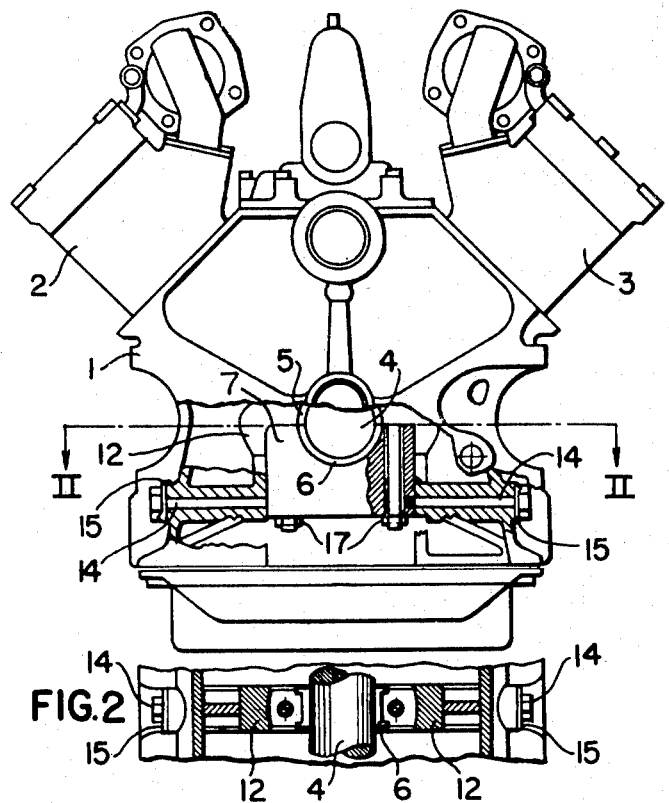
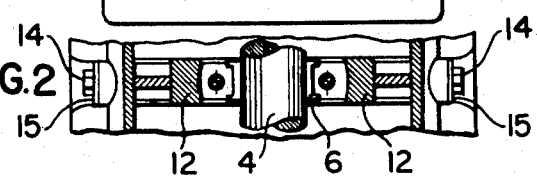
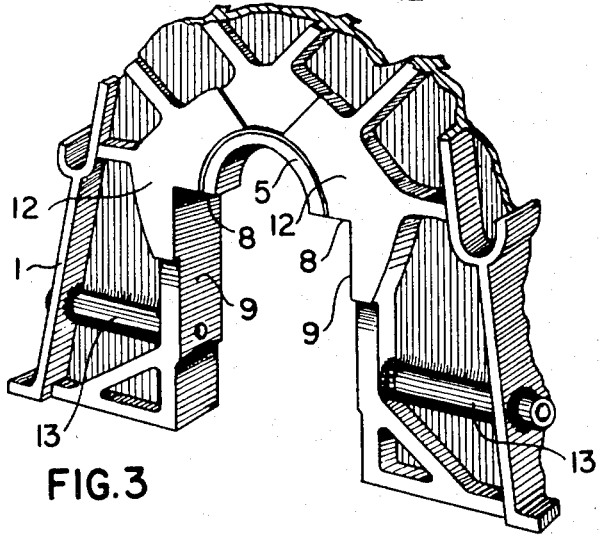
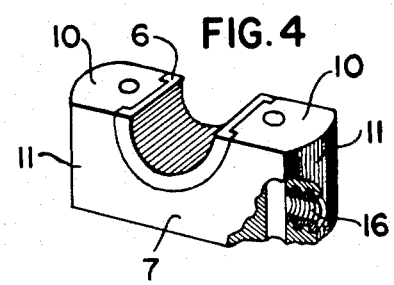
INVENTOR.
Günther Wilhelm Emele United States Patent Office 2,752,896
Patented July 3, 1956

2,752,896

CRANKCASES, PARTICULARLY FOR V-TYPE DIESEL ENGINES

Günther Wilhelm Emele, Munchen-Obermenzing, Germany, assignor to Krauss-Maffei Aktiengesellschaft, Munchen-Allach, Germany, a corporation of Germany Application April 21, 1952, Serial No. 283,451

Claims priority, application Germany January 23, 1952

2 Claims. (Cl. 121—194)

My invention relates to crankcases for internal-combustion engines, and more particularly to crankcases for diesel engines with V-arranged banks of cylinders.

In such engines the pulsating gas pressures have horizontal components which act upon the crankcase structure as tensioning forces perpendicular to the vertical, longitudinal plane of symmetry. These forces may locally overstress the crankcase material so that the affected places of the structure may become fissured, especially at the only slightly rounded transitions between the horizontal and the adjacent two vertical junction faces for the steeel or cast-steel covers of the crankshaft bearings. According to prior proposals, such overstresses can effectively be obviated by providing the crankcase structure with through bolts that individually traverse the entire width of the structure above and below the crankshaft bearing cover and extend perpendicularly to the vertical plane of symmetry. The purpose of these bolts is to subject the crankcase in the vicinity of the overstressed localities to a pre-stress approximately corresponding to the amplitudes of the pulsating tensioning forces caused by the varying gas pressures. While this expedient reduces the danger of cracking, the through bolts at both sides and below each crankshaft bearing require considerable space. This results in enlarged overall space requirements, especially undesirable with the compact designs of modern diesel engines, as well as in considerably increased manufacturing costs of the crankcase structure. Besides, the continuous through-bolts cannot be placed in the immediate vicinity of the most highly stressed localities near the crankshaft bearing when the screws would hinder the rotation of the crankshaft assembly.

It is an object of my invention to provide a reliable protection from damage by local overstress due to the above-mentioned causes, and yet to obviate the explained disadvantages of the known designs.

To this end, and in accordance with my invention, I provide for each crankshaft bearing of the crankcase structure two horizontally aligned screw bolts, which are screwed from both sides through the structure into the vertical sides of the bearing cover so that the two bolts and the cover form together a tensioning anchor which as a whole traverses the crankcase structure.

The two bolts when properly tightened place the crankcase structure under a compressive pre-stress close to the individual localities that may be subjected to overstress. Due to the fact that the bearing covers, consisting wholly or partly of steel, have comparatively large dimensions and great strength, they are readily capable of withstanding the pulsating stresses resulting from the ignition pressures. Consequently, the inclusion of the bearing covers into the prestressing anchor or through-bolt structure amply provides the desired security aside from the fact that it places the tensioning effect into the immediate vicinity of the endangered localities. As a further result the structure becomes less costly than that according to the prior proposals and offers also the advantage of greatly reduced space requirements.

The invention will be more fully understood from the following description of the embodiment illustrated on the drawing in which:

Fig. 1 shows a part sectional front view of a crankcase for a two cycle V-type diesel engine;

Fig. 2 shows a horizontal cross section of the same crankcase the section being taken along the plane denoted in Fig. 1 by II—II;

Fig. 3 shows a perspective view of one of the crankshaft bearing portions of the same crankcase structure; and Fig. 4 is a perspective view of the pertaining bearing cover showing a design somewhat modified over that of the bearing cover illustrated in Figs. 1 and 2.

The illustrated crankcase structure 1 of cast iron is joined with two V-arranged banks of cylinders 2 and 3 and has at both axial sides a bearing portion for the pertaining crankshaft 4. Each bearing portion is designed as follows.

The bearing proper has two half shells 5 and 6. The half shell 5 is seated in the crankcase structure, and the half shell 6 is seated in a bearing cover 7. In the embodiment of Figs. 1 and 2 the cover 7 consists wholly of steel or cast steel. In the modification of Fig. 4, the main body of the cover consists of light metal, such as an aluminum or magnesium alloy, and is equipped with steel inserts described in a later place.

The bearing portion of the crankcase structure has two horizontal shoulder faces 8 in a common plane on both sides respectively of the bearing shell 5. The two shoulder faces 8 are joined by respective vertical surfaces 9. The cover member 7 has vertical mating surfaces 10 and horizontal mating surfaces 11 which, in the assembled condition, are placed against the respective shoulder faces 8 and vertical faces 9 of the crankcase structure. The bearing portion of the crankcase structure has rounded reinforcements 12 at the highly stressed places where the shoulder faces 8 are joined with the respective vertical surfaces 9.

The crankcase structure is further equipped with two tubular reinforcement members 13 whose bores are horizontally aligned and traverse the crankcase structure from without to within at both sides respectively of the bearing cover. Two head screws 14 are inserted into the respective bores of reinforcements 13. The screw heads abut against the outside of the crankcase structure and the threaded portion of each screw bolt, which freely traverse the bore, is tightly screwed into a threaded bore of the bearing cover 7. Lock washers 15 placed under the respective screw heads serve to prevent accidental loosening of the screws. The screws 14 are tightened to such an extent that a pre-stress is exerted upon the crankcase structure 1 in the vicinity of the localities near the bearing that would otherwise be liable to suffer overstress due to the gas pressure fluctuations. In this manner the two screws 14 together with the body of the bearing cover 7 form a single tensioning anchor or through-bolt which traverses the entire crankcase structure and whose tensioning stress is effective in the immediate vicinity of the localities to be protected. The pulsating stresses to which this tensioning anchor is subjected are taken up by the elastic steel cover 7.

When providing a bearing cover 7 of light metal, two interiorly threaded sleeves 16 are firmly embedded into the cover body at the places of engagement with the respective head screws. The insert sleeves may be screwed or cast into the cover body. In the latter case the peripheral surface of the steel sleeves 16 are provided with grooves, serrations or the like, for preventing the inserts from being torn out of the cover body by the considerable pulling forces due to the tightening of the screws. This modification has also the advantage of reduced costs because the threaded steel inserts may be manufactured or procured as separate elements.

Two vertical screw bolts 17, passing through respective bores of cover 7, are provided for holding the bearing cover against the shoulder faces 8. The bolts 17 enter into portion 12 (Fig. 3) of the crankcase but do not traverse the crankcase. The through-bolt means for each bearing are formed exclusively of the two bolts 14 together with the bearing cover 7.

I claim:

1. In a V-type diesel-engine crankcase having through-bolt means for strengthening the crankcase, the combination of crankshaft bearing structures forming part of the crankcase, split-shell bearings each having two half shells of which one is seated in one of said respective structures, said structure having two aligned horizontal shoulder faces adjacent to both sides respectively of said half shell and having two vertical surfaces adjoining said respective shoulder faces, a bearing cover, said other half shell being seated in said cover, said cover having two horizontal faces seated on said respective shoulder faces and having vertical side surfaces engaging said vertical surfaces of said structure, said structure having two tubular reinforcement members horizontally aligned at both sides respectively of said cover, two horizontally aligned bolts freely traversing said respective members from the outside of said crankcase to said cover, said bolts having respective heads outside said structure and having respective threaded ends in threaded engagement with said cover, said bearing structure having a single through-bolt means formed only of said two bolts together with said cover.

2. A crankcase tensioning connection for V-type diesel engines, comprising a crankshaft bearing structure having aligned horizontal shoulder faces and having two vertical surfaces adjoining said respective shoulder faces, a bearing cover of light metal having two horizontal faces seated on said respective shoulder faces and having vertical side surfaces engaging said vertical surfaces of said structure, two interiorly threaded sleeves of steel inserted into said cover and firmly joined therewith at said respective vertical cover surfaces in horizontal alignment with each other, said structure having two tubular reinforcement members and having respective horizontal bores in said members aligned with said sleeves at both sides respectively of said cover, two bolts traversing said respective bores and having radial tolerance relative to said bores, said bolts having respective threaded heads abutting against said respective members on the outside of said structure, and said screws having respective ends in threaded engagement with said respective sleeves to form together with said cover a continuous tensioning connection horizontally traversing said structure.

References Cited in the file of this patent

UNITED STATES PATENTS

| 1,299,709 | Hall | Apr. 8, 1919 |
| 2,019,558 | Brush | Nov. 5, 1935 |
| 2,287,399 | Ware et al. | June 23, 1942 |
| 2,334,916 | Ford et al. | Nov. 23, 1943 |
| 2,340,885 | Kinnucan | Feb. 8, 1944 |
| 2,381,745 | Herreshoff et al. | Aug. 7, 1945 |

FOREIGN PATENTS

| 221,104 | Great Britain | Sept. 4, 1924 |
| 560,287 | Great Britain | Mar. 29, 1944 |